Figure 1:
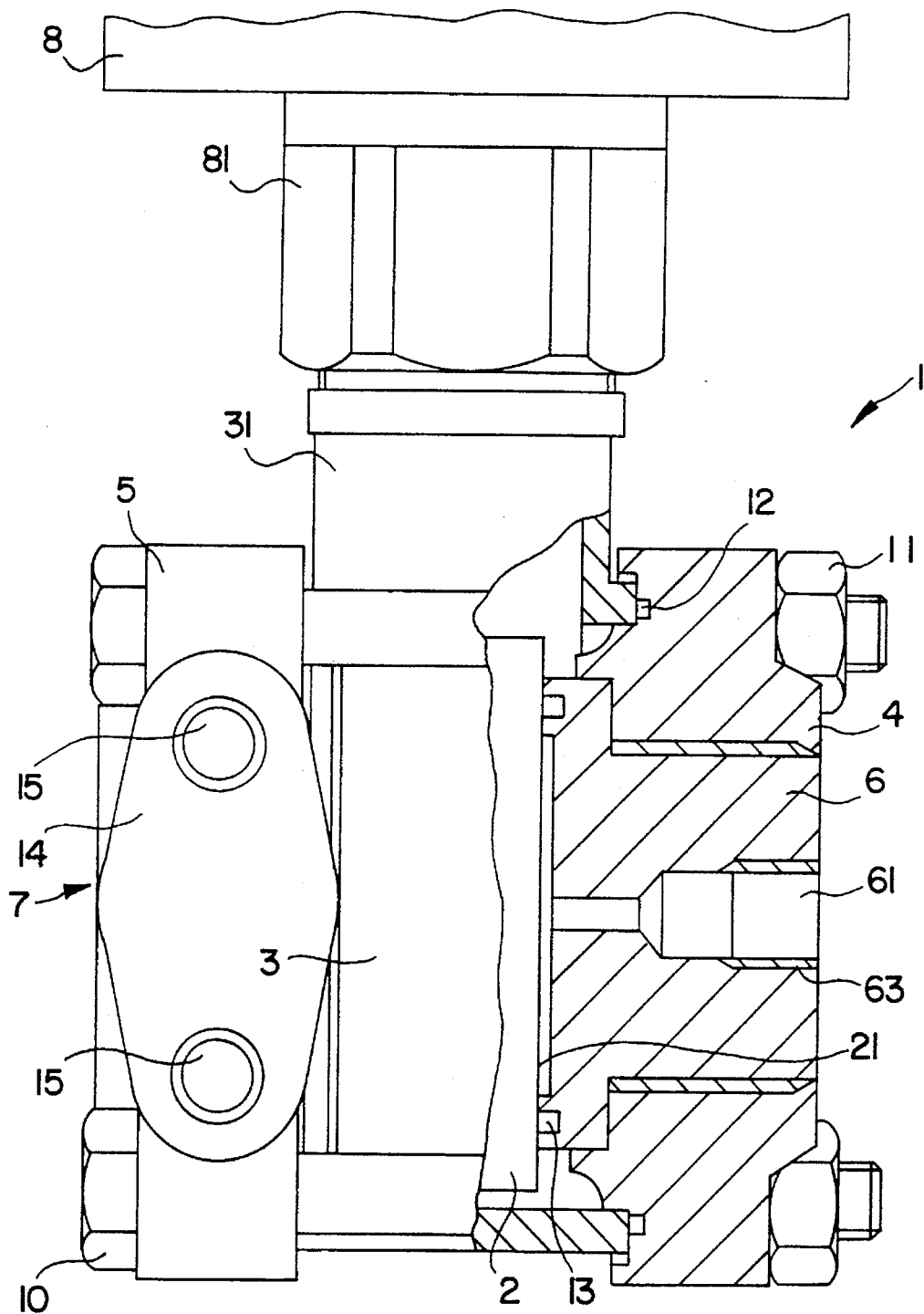

United States Patent [19]

Glienke et al.

[11] Patent Number: 5,499,539
[45] Date of Patent: Mar. 19, 1996

[54] METALLIC CONNECTING FLANGE FOR CERAMIC PRESSURE SENSING ELEMENTS

[75] Inventors: Horst Glienke, Lörrach; Winfried Maier, Maulburg, both of Germany

[73] Assignee: Endress + Hauser GmbH + Co., Germany

[21] Appl. No.: 244,176

[22] PCT Filed: Sep. 15, 1993

[86] PCT No.: PCT/DE93/00870

§ 371 Date: Jun. 2, 1994

§ 102(e) Date: Jun. 2, 1994

[87] PCT Pub. No.: WO94/07120

PCT Pub. Date: Mar. 31, 1994

[30] Foreign Application Priority Data

Sep. 23, 1992 [DE] Germany ............... 42 31 823.8
Sep. 23, 1992 [DE] Germany ............... 9212768 U

[51] Int. Cl.[6] ..................................................... G01L 7/00
[52] U.S. Cl. ................................................................ 73/756
[58] Field of Search ................................................ 73/756

[56] References Cited

U.S. PATENT DOCUMENTS

| | | | |
|---|---|---|---|
| 3,618,390 | 11/1971 | Frick | 73/718 |
| 4,993,265 | 2/1991 | Koen et al. | |
| 5,063,784 | 11/1991 | Ridenour | 73/756 |
| 5,313,839 | 5/1994 | Ridenour | 73/756 |

FOREIGN PATENT DOCUMENTS 204767   12/1983   Germany.
WO81/03678   12/1981   WIPO.

OTHER PUBLICATIONS

"High–Pressure Transducer Package NASA Tech Brief", N.T.I.S. Tech Notes, Springfield, Va., Nov. 1987.
"Konstruktionskriterien Für Druck–Und Differenzdruck–Messumformer", Von Dipl.–Ing. E. Freitage, May 1986, messen prüfen automatisieren, pp. 257–261.

*Primary Examiner*—Richard Chilcot
*Assistant Examiner*—Joseph L. Felber
*Attorney, Agent, or Firm*—Barnes & Thornburg

[57] ABSTRACT

The measurement of pressures makes it necessary to connect the pressure sensing element physically with the medium to be measured. For this, the sensing element is provided with metallic or nonmetallic connecting flanges. Until now, there existed the disadvantage that the metallic flanges frequently are not resistant to the aggressiveness and/or corrosiveness of the media to be measured. Nonmetallic connecting flanges are resistant to these media, but are not dimensionally stable at high processing temperatures. It is thus suggested to arrange a connecting pin consisting of a polymer plastic that is resistant, to the medium to be measured in a metallic connecting flange in such a way that the medium to be measured may only come in contact with the resistant plastic material, and that the temperature-dependent dimensional stability of the plastic part is insured by an axial and radial support by the metallic flange.

7 Claims, 2 Drawing Sheets

METALLIC CONNECTING FLANGE FOR CERAMIC PRESSURE SENSING ELEMENTS

DESCRIPTION

The invention pertains to a connecting flange for pressure sensing elements with a separable connection by means of which the connecting flange and the pressure sensing element are connected in a positive fashion, and with connecting elements via which the pressure sensing element is connected physically with the medium, the pressure of which is to be measured.

Pressure sensing elements of this type which are connected physically as well as positively with the connecting flange serve for measuring the differential pressure, excess pressure, negative pressure as well as the flow of gases, vapors, and liquids; such pressure sensing elements may also be used to measure the level of a container hydrostatically.

According to the generally known state of the art as, for example, described in the applicant's prospectus "Measuring transducer for differential pressure, Deltabar PMD 130," January, 1991, in particular on page 6 and in the illustration "Design of the measuring transducer, such measuring transducers consist of the ceramic measuring cell which is arranged in the interior of a measuring cell housing, the annular measuring cell housing, and two identically shaped connecting flanges which are arranged in a mirror image to each other and clamp the measuring cell with the measuring cell housing between themselves in a positive fashion such that it is sealed by means of separable screw connections. The measuring cell is connected to an electronic circuit via electrical connecting lines. The electronic circuit is enclosed by a housing. In addition, the electronics housing is equipped with connecting elements in order to produce the electrical connection between the pressure sensing element and an energy supply and/or information processing center. However, it is also possible to equip the electronics housing with a display device in order to display the pressure directly.

Holes penetrate through the two connecting flanges in order to connect the measuring cell with the medium to be measured physically. The lines by means of which measuring space and hence the medium to be measured are connected physically with the pressure sensing element may be connected to these holes.

Pressure sensing elements of this type are frequently used for measuring the pressure of aggressive or corrosive media which may be present in a gaseous or a liquid state. In such instances, it is necessary and customary to manufacture the connecting flange from a material which is resistant to the aggressiveness or corrosiveness of the medium to be measured. However, the annular seals which are clamped between the ceramic measuring cell and the connecting flanges as well as between the measuring cell housing and the connecting flanges must also consist of a material which is resistant to the medium to be measured. Connecting flanges consisting of high-alloy, noncorrosive steels, e.g., X 6 CrNiMoTi 17122 1.4571, or highly corrosion-resistant Ni, Co, Cr, Mo, Fe alloys are particularly suitable for this purpose.

However, when using pressure sensing elements under particularly difficult conditions, e.g., in a chemical plant, there exists the necessity to measure media, the aggressiveness and/or corrosiveness of which lies far beyond the resistance of conventional flange materials used. These media may, for example, consist of copper or sodium chloride, mixtures of hydrochloric acid and nitric acid, or heated sulfuric acids. In order to prevent materials which are not resistant to the aggressiveness or corrosiveness from coming into contact with the medium to be measured; it was already suggested to manufacture the connecting flanges of a polymer plastic which is resistant to most acids or bases instead of a metallic material.

The intense heating of the medium to be measured which is associated with the processing sequence in such chemical plants results in the disadvantage that such plastic flanges, despite the fact that they are resistant to the medium to be measured, lose their stability due to the high temperatures. This may lead to leaks and thus dangerous spillage of the medium to be measured at the positive connection between the connecting flange and the measuring cell housing.

The invention, in contrast, is based on the objective of specifying a connecting flange which insures that only parts consisting of a plastic material that is resistant to the aggressive and/or corrosive medium to be measured comes in contact with said medium in addition to the ceramic material of the pressure measuring cell, and that the plastic parts have a dimensional stability which insures a pressure seal of the pressure sensing element despite the high occurring temperatures.

The invention is described in detail below with the aid of the figures.

Figure 2:
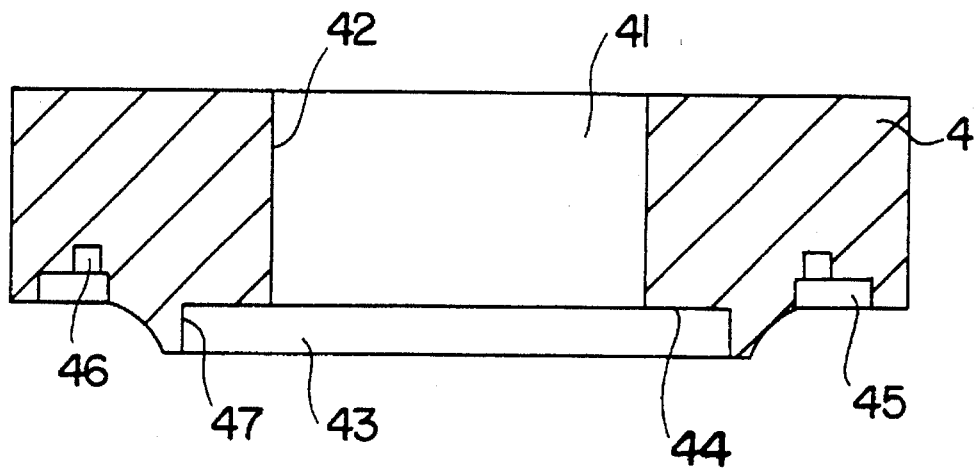
Figure 3:
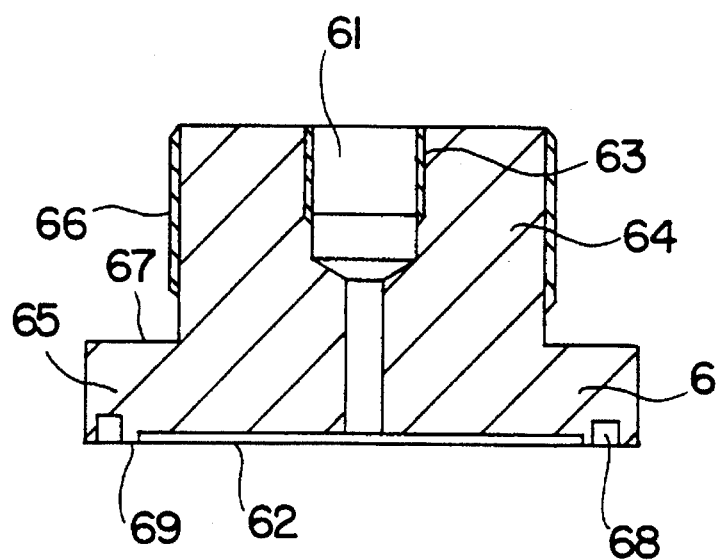

The figures show:

FIG. 1 a pressure sensing element which utilizes the connecting flange according to the invention, FIG. 2 a section through the connecting flange, and FIG. 3 a section through the connecting pin.

The reference numeral 1 in FIG. 1 identifies a pressure sensing element which, for example, may be a differential pressure sensing element, although the invention is not limited to this particular application example. In order to measure the differential pressure, it is necessary to charge the pressure measuring cell with both pressures, which is the reason why the differential pressure sensing element has two opposing connecting flanges which are constructed and arranged in a mirror image to each other. For reasons of simplicity, only one side of the differential pressure sensing elements 1 is discussed below.

The pressure sensing element 1 comprises the ceramic measuring cell 2, the measuring cell housing 3 enclosing the measuring cell 2, the connecting flanges 4 and 5, the connecting pins 6,7 as well as the electronics housing 8. The connecting flanges 4,5 are clamped together by means of a separable screw-nut connection 10,11 in such a way that they assume a position in which they clamp the measuring cell housing 3 between themselves. The connecting flanges 4,5 brace themselves against the measuring cell housing 3 as well as the ceramic measuring cell 2, whereby an annular seal 12,13 is inserted between the flange and the aforementioned elements. The bolts of the screws 10 penetrate through the connecting flanges 4,5 in order to produce the separable screw-nut connection 10,11.

The cylindrical intermediate piece 31 produces the physical connection between the measuring cell housing 3 and the electronics housing 8. In the interior of the intermediate piece 31 are arranged electrical lines (not shown in the figure) via which the measuring cell 2 is connected electrically to the electronic circuit situated in the interior of the electronics housing 8.

A hexagon 81 is situated at the side of the electronics housing 8 which faces the intermediate piece 31. The hexagon 81 serves for applying the torque by means of which the electronics housing 8 is screwed together with a not-shown thread of the intermediate piece 31 of the measuring cell housing 3 by means of the thread of the electronics housing 8 which is also not shown in the figures. In addition to the electric circuit, the electronics housing 8 also encloses electric connecting elements via which the pressure sensing element is connected electrically to an energy supply and/or information processing center. In addition, the electronics housing 8 may be equipped with an electrical display device which displays an electrical value which corresponds to the pressure of the medium to be measured, whereby said value was determined by means of the pressure sensing element. The flange-shaped surface 14 with the threaded holes 15 is provided for fastening the pressure sensing element 1 at the measuring point.

In order to determine the measured value, it is necessary to connect the pressure measuring cell 2 physically with the measuring space, i.e., the medium to be measured itself. This physical connection is produced by means of a not-shown connecting line, one end of which is connected to the wall enclosing the measuring space and the other end of which is connected to the connecting flange 4. A hole 61 penetrates through the connecting flange 4 in order to connect the connecting line with the measuring cell 2 physically. The hole 61 exits into a short cylindrical hollow space 62 (FIG. 3) which serves for distributing the pressure of the medium to be measured evenly onto the circular surface of the measuring membrane 21. An internal thread 63 is machined into the hole 61 in order to connect the connecting line to the connecting flange 4 and ceramic pressure sensor 2 via the plastic pin 6.

To measure the pressure of an aggressive or corrosive medium, it is necessary that only materials which are resistant to the medium to be measured come in contact with it. The ceramic measuring cell has this particular property. The selection of a suitable material for the connecting line is also necessary. However, metallic connecting flanges frequently cannot be used for extremely aggressive and corrosive media. This is the reason why one must resort to a nonmetallic material, e.g., a polymer plastic material. However, such plastics have the disadvantage that their dimensional stability decreases severely as the heat increases, so that a tight seal between the measuring cell 2 and the interior of the measuring cell housing 3 as well as between the measuring cell housing 3 and the environment is no longer insured, even when an annular seal 12 or 13 is inserted. In order to eliminate this disadvantage, a connecting pin 6 is provided which penetrates through the connecting flange 4 in such a way that only the connecting pin 6 may come in contact with the medium to be measured in addition to the measuring membrane 21. However, the stability of the connecting flange 4 is similar to that of a metallic flange that is resistant to high temperatures.

FIG. 2 shows that a hole 41 penetrates through the connecting flange 4 coaxially to its symmetry axis. The connecting flange 4 is manufactured in conventional fashion from a dimensionally stable metallic material. The outer surface of the hole 41 is provided with an internal thread 42. At the side facing the measuring cell 2, the hole 41 exits into a cylindrical section 43 of larger diameter. The section 43 has an outer surface 47. Due to the different diameter of the hole 41 and the cylindrical section 43, a radially extending annular shoulder 44 is formed at the base of the cylindrical section 43. In addition, a groove 45 of rectangular cross section is formed onto the face side of the connecting flange 4 which faces the measuring cell 2. The groove 45 extends around the hole 41 coaxially such that its symmetry axis coincides with the symmetry axis of the hole 41 and thus the connecting flange 4. The base of the groove 45 is penetrated by an additional groove 46. In assembled condition, the housing wall of the measuring cell housing 3 braces itself against the base of the groove 45 and is pressed against the annular seal 12 arranged in the groove 46 during this process.

FIG. 3 shows a section through the connecting pin 6 which is manufactured from a polymer plastic material, preferably a polyvinylidene fluoride (PVDF). The connecting pin 6 comprises a longer section of smaller diameter 64 and a shorter section of larger diameter 65. The outer surface of the section 64 is provided with an external thread 66. An annular shoulder 67 is also formed on the connecting pin 6 due to the different diameter of the sections 64 and 65, namely in the same fashion as in the hole 41 of the connecting flange 4, whereby said shoulder extends in radial direction and surrounds the section 64 in a rectangular fashion. At the surface facing the measuring cell 2, a groove 68 extends around the cylindrical hollow space 62 coaxially to the axis of symmetry of the hole 61 and the connecting pin 6. In assembled condition, an annular surface situated outside of the membrane 21 of the pressure measuring cell 2 braces itself against the annular sealing surface 69 of the connecting pin 6 which is not penetrated by the hollow space 62 and presses against an annular seal 13 arranged in the groove 68.

In order to prevent the aggressive or corrosive medium from coming into contact with the metallic connecting flange 4, the connecting pin 6 is screwed with its external thread 66 into the internal thread 42 of the connecting pin 4 in such a way that the section 64 penetrates through the hole 41 and braces the shoulder 67 against the shoulder 44. In this, a short piece of the section 65 of the connecting pin 6 penetrates through the cylindrical section 43 of the connecting flange 4. This means that the shoulder 44 absorbs all axial forces and the outer surface 47 of the section 43 absorbs all radial forces originating from the deformation of the polymer material of the connecting pin 6 which are caused by the temperature influences.

The connection of the connecting line with the connecting pin 6 and thus the physical connection of the measuring cell 2 with the connecting line via the hole 61 and the seal of the measuring cell 2 against the interior of the measuring cell housing 3 by means of the sealing surfaces 69,21 and the seal 13, insures that the medium to be measured does not come into contact with any materials other than the ceramic material of the measuring cell 2 and the polymer plastic of the connecting pin 6. In this process, the connecting pin 6 is supported and retained by the metallic connecting flange 4 in such a way that the tightness of the sealing surfaces is insured, even at higher temperatures of the medium to be measured or the processing environment.

It goes without saying that the connection between the connecting line and the connecting pin 6 may be realized by means of any other suitable type of connection than by threading the hole 61 similarly as thread 42 in FIG. 2

We claim:

1. A connecting flange assemblage for connecting a ceramic enclosed pressure sensor to a source of pressure medium to be sensed comprising:

A metallic connecting flange;

An intermediate piece for connecting an electronic housing to the ceramic enclosed pressure sensor;

A plastic connecting pin for connecting and conducting the source of pressure medium to the ceramic enclosed pressure sensor which plastic pin is resistant to the chemical properties of the pressure medium;

wherein the metallic connecting flange provides a support for the plastic pin and engages the intermediate piece;

wherein the plastic pin is sealing held against the ceramic enclosed pressure sensor by the metallic connecting flange; and wherein the metallic connecting flange does not directly contact the ceramic enclosed pressure sensor but rather applies a force to the plastic pin to provide the sealing so that the different relative expansions of the metallic connecting flange and ceramic enclosed sensor are accommodated.

2. A connecting assemblage according to claim 1, wherein there is a screw connection formed between an internal thread of the metallic connecting flange and an external thread of the plastic connecting pin, and wherein said screw connection facilitates the insertion and retention of the plastic connecting pin in the metallic connecting flange.

3. A connecting assemblage according to claim 1, wherein the metallic connecting flange has a recess therein which faces the ceramic pressure sensor and is defined by a shoulder and outer surface, and wherein the plastic connecting pin is braced axially on the shoulder and radially on the outer surface of the metallic connecting flange.

4. A connecting assemblage according to claim 1, wherein the plastic connecting pin is formed of a polyvinylidene fluoride (PVDF).

5. A connecting assemblage according to claim 1, wherein there is a cylindrical hollow space located between the plastic connecting pin and the ceramic enclosed pressure sensor, and a seal located between the plastic connecting pin and the ceramic enclosed pressure sensor to seal the sensor against the environment.

6. A connecting assemblage according to claim 1, wherein the metallic connecting flange is braced on an annular surface of the intermediate piece by inserting an annular seal in a groove on the metallic connecting flange, and wherein the plastic connecting pin is braced on an annular sealing surface of the ceramic enclosed pressure sensor by insertion of an annular seal between the plastic connecting pin and the ceramic enclosed pressure sensor.

7. A connecting assemblage according to claim 1 wherein the plastic pin extends completely through a portion of the metallic flange.

* * * * *